(12) United States Patent
Zhou

(10) Patent No.: US 12,589,356 B2
(45) Date of Patent: Mar. 31, 2026

(54) DESULFURIZATION AND SULFUR RECOVERY METHOD FOR SULFUR DIOXIDE FLUE GAS

(71) Applicant: TongLing Nonferrous Metals Group Holdings Co., Ltd., Tongling City (CN)

(72) Inventor: Jun Zhou, Tongling City (CN)

(73) Assignee: TongLing Nonferrous Metals Group Holdings Co. Ltd., Tongling City (CN)

( * ) Notice: Subject to any disclaimer, the term of this patent is extended or adjusted under 35 U.S.C. 154(b) by 518 days.

(21) Appl. No.: 18/084,727

(22) Filed: Dec. 20, 2022

(65) Prior Publication Data

US 2023/0219037 A1 Jul. 13, 2023

(30) Foreign Application Priority Data

Jan. 13, 2022 (CN) .......................... 202210036445.X

(51) Int. Cl.
*B01D 53/80* (2006.01)
*B01D 53/50* (2006.01)
(Continued)

(52) U.S. Cl.
CPC ........... *B01D 53/80* (2013.01); *B01D 53/502* (2013.01); *B01J 20/041* (2013.01);
(Continued)

(58) Field of Classification Search
CPC .................. B01D 53/50; B01D 53/502; B01D 2251/404; B01D 2251/602;
(Continued)

(56) References Cited

U.S. PATENT DOCUMENTS 3,965,242 A * 6/1976 Morita ................. B01D 53/501
423/166
3,985,860 A * 10/1976 Mandelik ............. B01D 53/501
423/166

FOREIGN PATENT DOCUMENTS

CN 103072956 B * 4/2015
CN 111285390 A 6/2020
(Continued)

OTHER PUBLICATIONS

Machine Translation 103072956 (Year: 2015).*
(Continued)

*Primary Examiner* — Christina A Johnson
(74) *Attorney, Agent, or Firm* — Bay State IP, LLC

(57) ABSTRACT

The present disclosure provides a desulfurization and sulfur recovery method for sulfur dioxide flue gas, and belongs to the technical field of non-ferrous metal smelting. The method includes the following steps: desulfurizing the sulfur dioxide flue gas by taking slagging flux limestone or quick-lime for smelting or converting process as a desulfurizer, and adsorbing $SO_2$ in the gas to obtain gypsum residue, calcium sulfite, and the desulfurized flue gas, where $SO_2$ in the sulfur dioxide flue gas before desulfurization is less than 1 vol %; and recycling the gypsum residue and the calcium sulfite to the smelting or converting furnace for slagging, resolving the $SO_2$ into smelting off-gas, producing sulfuric acid in acid plant.

8 Claims, 3 Drawing Sheets

(51) Int. Cl.

| | |
|---|---|
| *B01J 20/04* | (2006.01) |
| *B01J 20/30* | (2006.01) |
| *B01J 20/34* | (2006.01) |
| *C01B 17/74* | (2006.01) |

(52) U.S. Cl.
CPC ....... *B01J 20/3021* (2013.01); *B01J 20/3433* (2013.01); *B01J 20/3483* (2013.01); *C01B 17/745* (2013.01); *B01D 2251/404* (2013.01); *B01D 2251/602* (2013.01); *B01D 2251/606* (2013.01); *B01D 2257/302* (2013.01)

(58) Field of Classification Search
CPC ........ B01D 2251/606; B01D 2257/302; B01D 2258/025; B01D 2258/0283; B01D 53/81; B01J 20/041; B01J 20/3433; B01J 20/3483; C01B 17/745; C01B 17/74
USPC ............ 423/242.1, 243.01, 243.08, 522, 530
See application file for complete search history.

(56) References Cited

FOREIGN PATENT DOCUMENTS

| | | | |
|---|---|---|---|
| CN | 111705225 | A | 9/2020 |
| CN | 211411611 | U * | 9/2020 |

OTHER PUBLICATIONS

Machine Translation 111705225 (Year: 2020).*
Machine Translation 111285390 (Year: 2020).*
Machine Translation 211411611 (Year: 2020).*

* cited by examiner

DESULFURIZATION AND SULFUR RECOVERY METHOD FOR SULFUR DIOXIDE FLUE GAS

CROSS REFERENCE TO RELATED APPLICATION

This patent application claims the benefit and priority of Chinese Patent Application No. 202210036445.X, filed with the China National Intellectual Property Administration on Jan. 13, 2022, the disclosure of which is incorporated by reference herein in its entirety as part of the present application.

TECHNICAL FIELD

The present disclosure relates to the technical field of non-ferrous metal smelting, and in particular to a desulfurization and sulfur recovery method for a sulfur dioxide flue gas.

BACKGROUND

Smelting and producing blister copper (anode copper) from sulfide copper concentrate usually requires three process steps: smelting, converting, and anode refining. Smelting process includes bath smelting and flash smelting. Converting process includes conventional Peirce-Smith (PS) converting and emerging continuous converting processes, including bath converting and flash converting. In the smelting process, silica sand is usually used as flux to produce $FeO$—$Fe_2O_3$—$SiO_2$ system slag, or silica sand and a small amount of limestone can be used as flux to produce $CaO$—$FeO$—$Fe_2O_3$—$SiO_2$ system slag. The conventional PS converting process uses silica as the flux to produce slag mainly composed of fayalite ($2FeO \cdot SiO_2$). In the continuous converting process, limestone or quicklime is used as flux to produce $CaO$—$Cu_2O$—$Fe_2O_3$ ferrite slag, except for the SKS bottom blowing converting process in which fayalite slag is used. Besides, silica sand is used as the flux for smelting of lead sulfide and nickel sulfide concentrates, the slag type of which is similar to that of copper concentrate smelting. In these smelting processes, a small amount of limestone or other calcium fluxes, such as gypsum, can be added.

No matter what smelting and converting process is employed, a certain amount of emission $SO_2$ gas is produced in smelting and converting operation. Especially when PS converting process is employed, more emission gas with low $SO_2$ strength will be produced. All those emission SO2 gases need to be collected by the environmental ventilation system and to be desulfurized. The blister copper produced in converting contains a certain amount of sulfur, particularly the blister copper produced by the continuous converting processes contains even higher sulfur. In the oxidation stage of anode refining, great amount of weak $SO_2$ flue gas is produced which needs to be desulfurized before vented to the air. Whether in the PS converting process or in the continuous converting process, the flue gas is great to be desulfurized. Therefore, it makes great significance for copper smelters, in combination with the characteristics of the smelting process, to take a desulfurization process with small investment and low operation cost, meeting the environmental regulations for gas emission, not producing sulfur containing waste residues and waste liquid, and effectively recovering $SO_2$ in the gas producing sulfuric acid.

At present, there are many proven gas desulfurization technologies which can be divided into "recovery way" and "waste way" by $SO_2$ capture ways. By the "recovery way" the gas is desulfurized while sulfuric acid or other chemical products are produced with the removed $SO_2$. The typical processes include: Cansolv organic amine absorption-desorption process, hydrogen peroxide process, catalytic process, ionic liquid process, activated carbon process, and etc. Although conforming to the technical route of "circular economy", the "recovery way" processes generally have such problems as high investment and operational cost, high energy consumption. Among the processes the ionic liquid process is the most widely applied in the copper smelters. By the "waste way" $SO_2$ in the gas is converted into liquid or solid salts. $SO_2$ is not recovered to products, but is lost with sulfate solution or waste residues. The "waste way" includes ammonia solution process, sodium hydrate process, lime-gypsum process, magnesium oxide process, "double alkali" process, zinc oxide process, and etc. Those processes have such advantages as low investment and operational cost while disadvantages of them include waste of sulfur resources, producing certain solid and liquid wastes that need to be further handled. Among the "waste way" processes, the lime-gypsum process is the most widely applied which has such advantages as simple proven and reliable process, low investment and operational cost, cheaper and easier obtainable desulfurizer limestone. However, this process has disadvantages that the sulfur in the produced gypsum cannot be recovered to produce sulfuric acid, and to produce clean salable gypsum, the gas must be strictly dedusted which has great environmental risks.

The blister copper produced by the continuous converting process contains higher sulfur, normally more than 10 times of that produced by the PS converter. Great amount of weak $SO_2$ gas will be produced in anode refining of the blister copper with high sulfur Whether the "recovery way" or the "waste way" is applied for desulfurization, such problems will emerge as high investment and operational cost, difficult treatment of the large amount of waste liquid and waste residues. To cope with these problems, some smelters have to conduct the anode furnace gas to the smelting and converting furnace gas, mixing and sending the gases to the acid plant for acid production. However, this practice give rise to difficulties in acid plant operation due to fluctuant SO2 and gas flow from the anode furnace. Many copper smelters operate the ionic-liquid desulfurization process, but the process has large investment, high operation cost, and high energy consumption, which has a great impact on the operational cost and benefit of the plant.

SUMMARY

In view of this, the present disclosure aims to provide a desulfurization and sulfur recovery method for $SO_2$ flue gas. The desulfurization method of the present disclosure has low energy consumption, does not produce solid wastes that are difficult to deal with, and can effectively recover $SO_2$ in the flue gas to produce sulfuric acid.

To achieve the above objective, the present disclosure provides the following technical solutions.

The present disclosure provides a desulfurization and sulfur recovery method for sulfur dioxide flue gas, including the following steps:

taking part or all of the slagging flux limestone or lime for smelting or converting process as desulfurizer, the sulfur dioxide gas is desulfurized. $SO_2$ in the gas is chemically absorbed, gypsum residue and calcium sulfite is produced and desulfurized flue gas is obtained. $SO_2$ in the so-called sulfur dioxide flue gas is less than 1 vol %; The produced gypsum residue and calcium sulfite return to the smelting and/or converting furnace for slagging, where they are decomposed and $SO_2$ is released into the flue gases, producing sulfuric acid in acid plant.

Preferably, a process includes the following steps in which returning the gypsum residue and the calcium sulfite to the smelting for slagging and recovering sulfur to produce sulfuric acid:

grinding and slurrying the flux in sequence to obtain desulfurization slurry;

desulfurizing the sulfur dioxide flue gas with the desulfurization slurry to obtain the desulfurized flue gas and gypsum slurry;

filtering the gypsum slurry to obtain gypsum residue and calcium sulfite; and blending the gypsum residue and the calcium sulfite with silica sand and copper concentrate, feeding the mixture to the smelting process, and resolving the $SO_2$ into smelting flue gas to produce sulfuric acid in the acid plant.

Preferably, the desulfurization slurry has a mass density of 10%-20%.

Preferably, the ratio of the total mass of gypsum residue and calcium sulfite to the mass of silica and copper concentrate is (0-0.8):5:100.

Preferably, a process includes the following steps in which returning the gypsum residue and the calcium sulfite to the converting for slagging and recovering sulfur to produce sulfuric acid:

grinding and slurrying the slagging flux in sequence to obtain desulfurization slurry;

desulfurizing the sulfur dioxide flue gas with the desulfurization slurry to obtain the desulfurized flue gas and gypsum slurry;

filtering the gypsum slurry to obtain the gypsum residue and the calcium sulfite; and if flash converting process is employed, blending the gypsum residue and the calcium sulfite with matte and flux, feeding the mixture to the flash converting process for slagging, and resolving the $SO_2$ into converting flue gas to produce sulfuric acid in the acid plant. More limestone or lime is fed in the flash converting process; and if bath converting process is employed, liquid matte is fed into the bath converting furnace, and the gypsum residue and the calcium sulfite is blended with the limestone or lime, fed to the bath converting furnace for slagging. $SO_2$ is released into the converting flue gas and sulfuric acid is produced in the acid plant.

Preferably, mass density of the desulfurization slurry is 10%-20%.

Preferably, the ratio of the total mass of gypsum residue and calcium sulfite to the mass of the matte fed to a flash or bath converting furnace is (0-3):100.

Preferably, the ratio of the matte to the limestone/lime fed to a flash or bath converting furnace is 100:(1-5).

Preferably, the ratio of the total mass of gypsum residue and the calcium sulfite to the mass of limestone or lime fed to the converting furnace is (0-1):(0.5-1.5).

Preferably, when the gypsum residue and the calcium sulfite are returned to both the smelting and converting furnace for slagging, the ratio of the mass to the smelting furnace to the mass to the converting furnace is (0-100): (100-0).

The desulfurization and sulfur recovery method of the present disclosure is suitable for desulfurization and sulfur recycling of weak $SO_2$ flue gas in smelting of non-ferrous sulfide concentrate. The slagging flux limestone and/or lime are/is used as the desulfurizer, reacting with $SO_2$ in the flue gas and producing gypsum and calcium sulfite. Through multi-stage (more than 2 levels) desulfurization design of the desulfurization tower, $SO_2$ in the flue gas can be removed meeting the emission requirement of less than 100 mg/Nm³. The gypsum and calcium sulfite produced by desulfurization are fed to the smelting and/or converting furnace, decomposing under high temperature and producing SO2 which enters the flue gas for sulfuric acid production. CaO produced by decomposing is merged into the slag. The desulfurization method of the present disclosure is low in energy consumption, and does not produce solid wastes difficult to be handled. Besides, the cost of the desulfurizer material is saved, and all of the gypsum and the calcium sulfite produced are fed to the smelting and/or converting furnace for slagging without waste residues and effluent produced. By the method of the present disclosure $SO_2$ in weak SO2 gas can be effectively recovered for sulfuric acid production. Therefore, the present disclosure has such advantages as low investment and operation cost, no desulfurizer cost, no desulfurization residues and effluent, higher sulfur recovery, and etc.

Furthermore, the present disclosure has no strict requirements to dedusting of the weak SO2 gas before desulfurization, resulting in low investment and operation cost of dedusting.

BRIEF DESCRIPTION OF THE DRAWINGS ATTACHED

DETAILED DESCRIPTION OF THE EMBODIMENTS

Figure 1:
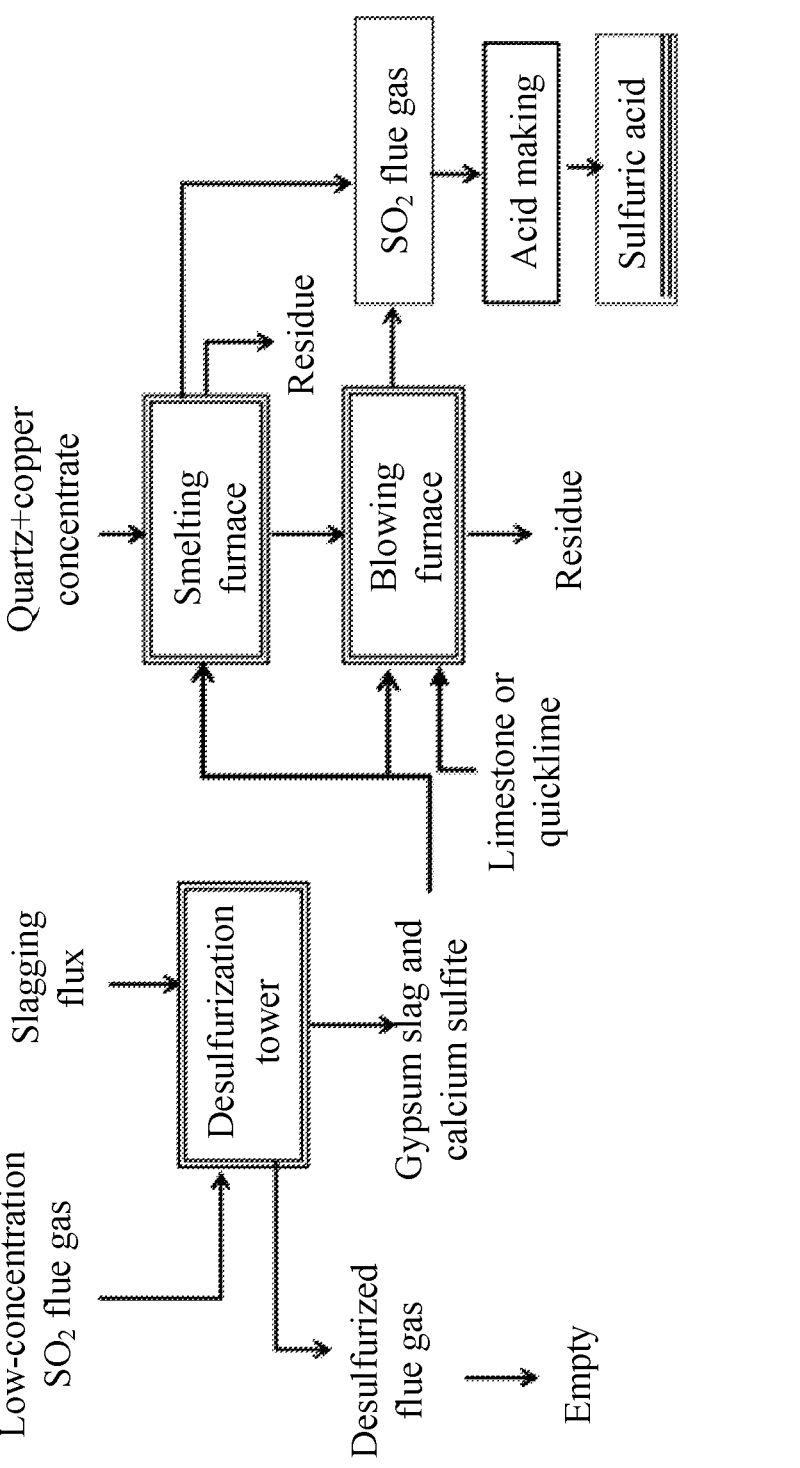
FIG. 1 is the flow diagram of the desulfurization and sulfur recovery method of the present disclosure for sulfur dioxide gas in smelting of non-ferrous metal sulfide concentrate.

The present disclosure provides a desulfurization and sulfur recovery method for sulfur dioxide flue gas, including the following steps.

Taking part or all of the flux, limestone or lime, in smelting or converting as a desulfurizer, the sulfur dioxide flue gas is desulfurized. $SO_2$ in the flue gas is chemically adsorbed producing gypsum slag and calcium sulfite, and desulfurized flue gas is obtained. $SO_2$ strength in the gas before desulfurization is less than 1 vol %. The produced gypsum residue and calcium sulfite are recycled to the smelting and/or converting furnace for slagging, and $SO_2$ is released into the smelting/converting flue gas for sulfuric acid production in the acid plant.

In the present disclosure, chemical reactions occurring in the desulfurization process are as follows:

$$CaCO_3SO_2\cdot\tfrac{1}{2}H_2O \rightarrow CaSO_3\cdot\tfrac{1}{2}H_2O + CO_2\uparrow,$$

$$CaO + H_2O \rightarrow Ca(OH)_2,$$

$$Ca(OH)_2+SO_2 \rightarrow CaSO_3 \cdot \tfrac{1}{2}H_2O+\tfrac{1}{2}H_2O,$$

$$CaSO_3 \cdot \tfrac{1}{2}H_2O+SO_2+\tfrac{1}{2}H_2O \rightarrow Ca(HSO_3)_2,$$

$$2CaSO_3 \cdot \tfrac{1}{2}H_2O+O_2+3H_2O \rightarrow 2CaSO_4 \cdot 2H_2O, \text{ and}$$

$$Ca(HSO_3)_2+\tfrac{1}{2}O_2+H_2O \rightarrow CaSO_4 \cdot 2H_2O+SO_2\uparrow.$$

In the present disclosure, the sulfur dioxide flue gas preferably comes from smelting of non-ferrous metal sulfide concentrate.

In the present disclosure, the smelting of the non-ferrous metal sulfide concentrate preferably includes copper sulfide concentrate smelting, lead sulfide concentrate smelting, or nickel sulfide concentrate smelting.

In the present disclosure, the sulfur dioxide flue gas preferably includes environment ventilation gas, tail gas from acid plant, anode refining furnace flue gas, and flue gas from anode slime refinery. The environment ventilation gas preferably comes from the gases emitting into the smelting plant and collected by the environmental ventilation system. The present disclosure has no special limitations on the environmental ventilation system, and an environmental ventilation system well known to those skilled in the art may be adopted.

In the present disclosure, the desulfurization is preferably conducted in a desulfurization tower.

In the present disclosure, the sulfur dioxide flue gas is preferably dedusted before entering the desulfurization tower through an exhaust fan In the present disclosure, gas dedusting is preferably conducted in a bag-filter. In the present disclosure, the anode refining furnace gas is preferably cooled before dedusting, preferably to be below 150° C. to meet the requirements of dedusting operation. In the present disclosure, the gas cooling is preferably conducted in a cooler.

In the present disclosure, since the gypsum residue and calcium sulfite produced are recycled to the smelting or converting furnace for slagging, the sulfur dioxide gas can directly enter the desulfurization tower through the exhaust fan without dedusting, if only the operation of the exhaust fan allows.

In the present disclosure, when preferably not dedusted, the anode refining furnace gas is preferably cooled to be below 300° C., meeting the operational requirements of the exhaust fan.

In the present disclosure, the smelting is preferably conducted in a smelting furnace.

In the present disclosure, the smelting furnace preferably includes flash smelting furnace and bath smelting furnace. The flash smelting furnace preferably includes copper concentrate flash smelting furnace and nickel concentrate flash smelting furnace. The bath smelting furnace preferably includes oxygen-enriched side-blowing smelting furnace, oxygen bottom blowing smelting furnace, Ausmelt or Isasmelt smelting furnace. More preferable is the copper concentrate oxygen-enriched side-blowing smelting furnace, the copper concentrate oxygen bottom blowing smelting furnace, the copper concentrate Ausmelt or Isasmelt smelting furnace, the lead concentrate oxygen bottom blowing smelting furnace, the lead concentrate oxygen-enriched side-blowing smelting furnace, the lead concentrate Kivcet smelting furnace, the nickel concentrate Ausmelt or Isasmelt smelting furnace.

In the present disclosure, the gypsum residue and the calcium sulfite are recycled to the smelting process for slagging, and sulfur is recovered for sulfuric acid production. The desulfurization and sulfur recovery preferably includes the following steps.

The slagging flux is ground and pulped in sequence to obtain desulfurization slurry.

The sulfur dioxide off gas is desulfurized by the desulfurization slurry to obtain the desulfurized gas and gypsum slurry.

Liquid-solid separation is conducted on the gypsum slurry to obtain the gypsum residue and the calcium sulfite.

The produced gypsum residue and the calcium sulfite are recycled to the blending plant of the smelter, blended with silica sand and copper concentrate and fed to the smelting furnace.

In the present disclosure, the gypsum residue and the calcium sulfite are recycled to the smelting furnace for slagging, and chemical reactions occurring in the slagging process are as follows:

$$CaSO_4 \cdot 2H_2O = CaSO_4 + 2H_2O,$$

$$CaSO_3 \cdot \tfrac{1}{2}H_2O = CaSO_3 + \tfrac{1}{2}H_2O,$$

$$CaSO_4 = CaO + SO_2 + \tfrac{1}{2}O_2,$$

$$CaSO_3 = CaO + SO_2, \text{ and}$$

$$CaO + xFeO + yFe_2O_3 + zSiO_2 = CaO \cdot xFeO \cdot yFe_2O_3 \cdot zSiO_2.$$

In the present disclosure, the smelting takes the fayalite type slag. The gypsum residue and the calcium sulfite produced by desulfurization are fed into the smelting furnace for slagging. The $SO_2$ absorbed by limestone or lime, producing the gypsum slag and the calcium sulfite, can be released into the smelting off gas and sent to the acid plant for sulfuric acid production so that SO2 is recovered as sulfuric acid. The CaO produced by decomposition of the gypsum residue and the calcium sulfite is involved in smelting and slagging, reducing slag viscosity and beneficial to reducing copper loss in slag.

In the present disclosure, the slagging flux limestone or lime is ground and the slurry is made in sequence so that the desulfurization slurry is obtained.

In the present disclosure, the slagging flux after grinding preferably has a particle size of 0.5 mm.

In the present disclosure, the desulfurization slurry preferably has a mass concentration of 10%-20%.

In the present disclosure, after the desulfurization slurry is made, the sulfur dioxide gas is desulfurized with the desulfurization slurry, obtaining the desulfurized gas and gypsum slurry.

In the present disclosure, the desulfurization process is preferably completed in the desulfurization tower. Solid content of the desulfurization limestone slurry is preferably 10%-20%. Gas velocity in the tower is preferably 2.6-3.2 m/s. The ratio of liquid to gas is preferably 10-15 L/Nm³. The ratio of calcium to sulfur is preferably 1.02 mol/mol. The contact reaction time in the absorption area is preferably 2-3 s. The desulfurization efficiency is preferably greater than or equal to 88%, and it will also be improved with the increase of desulfurization spray levels.

In the present disclosure, the desulfurization slurry is in reverse contacting with the sulfur dioxide gas during desulfurization operation.

In the present disclosure, after the gypsum slurry is obtained, liquid-solid separation is conducted for the gypsum slurry, obtaining the gypsum residue and the calcium sulfite. In the present disclosure, there is no special limitations on the specific method of the liquid-solid separation, and a method well known to those skilled in the art may be adopted. Specifically, a thickener shall be used for concentration before a vacuum belt filter is used for filtration.

In the present disclosure, after the gypsum residue and the calcium sulfite are obtained, they are blended with silica and copper concentrate, and then fed to the smelting furnace.

In the present disclosure, the ratio of the total mass of the gypsum residue and the calcium sulfite to the mass of silica and copper concentrate is preferably (0-0.8):5:100, and more preferably 0.5:5:100. In the present disclosure, the gypsum residue and the calcium sulfite are decomposed into CaO and SO2 containing gas in the smelting furnace. CaO is slagged with silica and copper concentrate producing the fayalite type slag.

In the present disclosure, the fayalite type slag, matte, and the $SO_2$ containing gas are preferably obtained in the smelting process, and the matte is preferably fed to the converting furnace producing blister copper and SO2 containing gas. The SO2 containing gases are combined and flow to the acid plant for sulfuric acid production. The present disclosure has no special limitations on the specific method for sulfuric acid production, and a method well known to those skilled in the art may be adopted.

Figure 3:
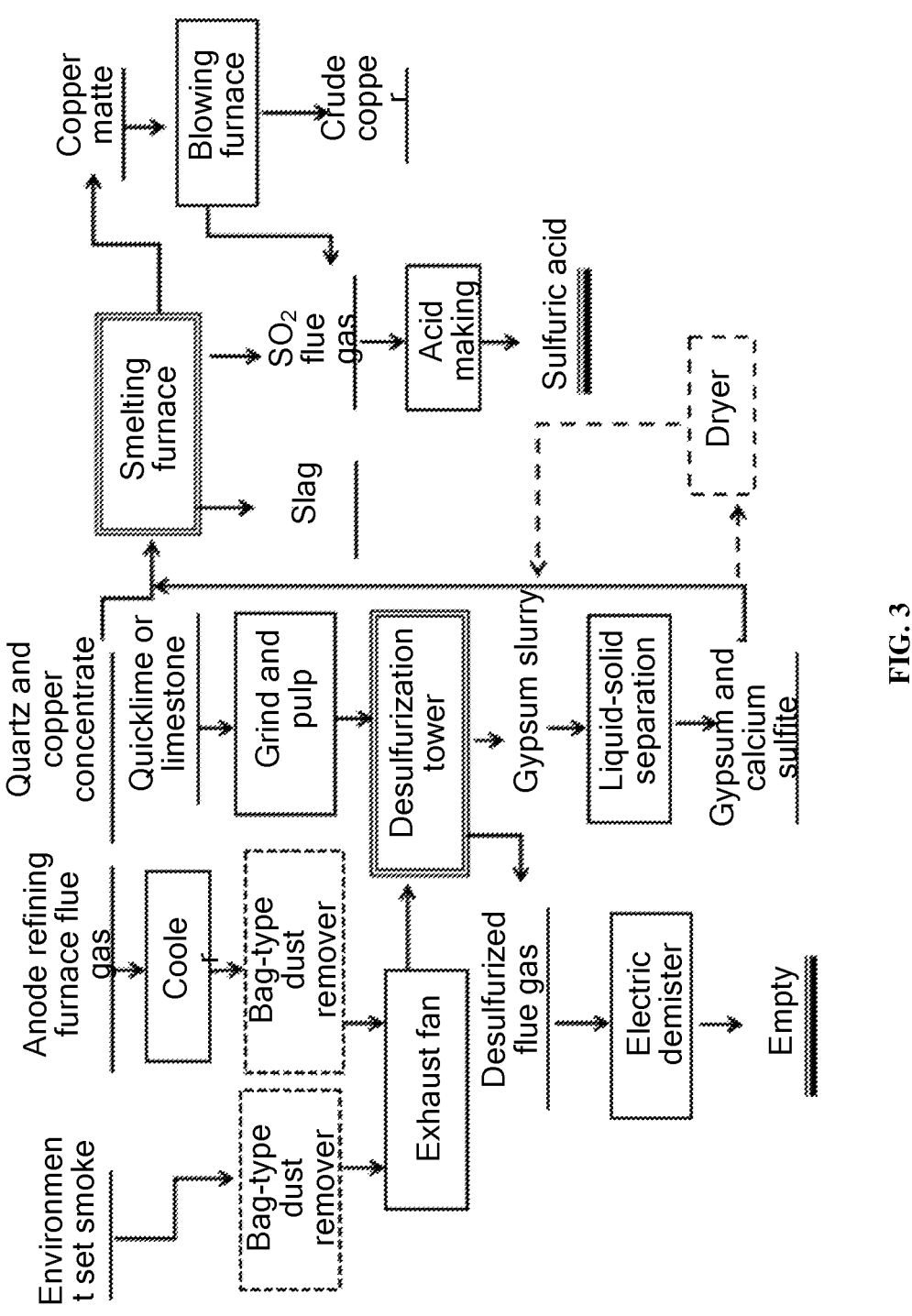
FIG. 3 is the flow diagram of the desulfurization and sulfur recovery method when the converting furnace takes iron silicate slag.

FIG. 3 shows the flow diagram of the desulfurization and sulfur recovery process when iron silicate slag is taken for the converting. The anode refining furnace off gas is cooled in the cooler before entering the bag filter for dust removal. The environment ventilation gas enters the bag filter for dust removal. After dedusted, the two off-gases are combined and then flow into the desulfurization tower by the exhaust fan for desulfurization. By taking the slagging flux limestone/lime as the desulfurizer, the sulfur dioxide off-gas produced in the smelting of non-ferrous metal sulfide concentrate is desulfurized and the desulfurized gas and gypsum slurry is obtained. The gypsum slurry is subjected to liquid-solid separation producing the gypsum residue and the calcium sulfite. When bath smelting process is employed, the gypsum residue and the calcium sulfite are directly fed to the smelting furnace after being blended with the silica and the copper concentrate. When flash smelting process is employed, the gypsum residue and the calcium sulfite are blended with the silica and the copper concentrate, dried in a dryer, and then fed to the smelting furnace, producing slag, sulfur dioxide containing off-gas and matte (copper matte). The matte is then fed to the converting furnace producing blister copper and sulfur dioxide containing off-gas. The two streams of sulfur dioxide containing off-gas are combined for sulfuric acid production. The desulfurized gas is treated by a wet ESP before vented to the air.

In the present disclosure, the converting is preferably performed in the converting furnace.

In the present disclosure, the converting furnace preferably includes flash converting furnace, Mitsubishi converting furnace, oxygen bottom blowing converting furnace, multi-lance top blowing converting furnace, PS converter, reduction side-blowing furnace, reduction bottom blowing furnace, or slag fuming furnace, and etc. More preferably are the continuous converting furnaces for copper matte (including flash converting furnace, Mitsubishi converting furnace, oxygen bottom blowing converting furnace, multi-lance top blowing converting furnace, and etc.), PS converter for copper matte, reduction side-blowing furnace for high-lead slag, reduction bottom blowing furnace for high-lead slag, slag fuming furnace in lead smelting PS converter for nickel matte, and etc.

In the present disclosure, the gypsum residue and the calcium sulfite are recycled to the converting furnace for slagging, and sulfur is recovered for sulfuric acid production. The desulfurization and sulfur recovery method preferably includes the following steps.

The slagging flux is ground and made into slurry in sequence to obtain desulfurization slurry.

The sulfur dioxide gas is desulfurized by the desulfurization slurry to obtain the desulfurized gas and gypsum slurry.

The gypsum slurry is filtered to obtain the gypsum residue and the calcium sulfite.

If flash converting process is employed, the gypsum residue, calcium sulfite are blended with copper matte and then fed to the flash converting furnace for slagging, and $SO_2$ is resolved into the converting off-gas to produce sulfuric acid in the acid plant. Additional limestone or lime is fed to the flash converter.

If bath converting process is employed, in the progress of feeding liquid matte to the bath converting furnace, the gypsum residue, and calcium sulfite are blended with the limestone or lime and then fed to the bath converting furnace for slagging. $SO_2$ is resolved into the converting off-gas and sulfuric acid is produced in the acid plant.

In the present disclosure, when the converting process takes calcium ferrite slag, the gypsum residue and the calcium sulfite produced by desulfurization are to be recycled to the converting furnace for slagging, and the chemical reactions occurring in the slagging process are as follows:

$$CaSO_4 \cdot 2H_2O = CaSO_4 + 2H_2O,$$

$$CaSO_3 \cdot \frac{1}{2}H_2O = CaSO_3 + \frac{1}{2}H_2O,$$

$$CaSO_4 = CaO + SO_2 + \frac{1}{2}O_2,$$

$$CaSO_3 = CaO + SO_2,$$

$$2Fe_3O_4(s) + \frac{1}{2}O_2(g) + 3CaO(s) = 3CaFe_2O_4(s),$$

$$2Fe_3O_4(s) + 2CaO(s) + CaSO_4 = 3CaFe_2O_4(s) + SO_2, \text{ and}$$

$$2Fe_3O_4 + 3CaSO_4 = 3CaFe_2O_4 + 3SO_2 + O_2.$$

In the present disclosure, when the converting process takes the calcium ferrite slag, the gypsum residue and the calcium sulfite produced by desulfurization are preferably fed to the converting furnace for slagging while $SO_2$ is recovered as sulfuric acid.

The present disclosure, the flux limestone or lime is ground and made into slurrying sequence, obtaining the desulfurization slurry.

In the present disclosure, the slagging flux after grinding preferably has a particle size of 0.5 mm.

In the present disclosure, the desulfurization slurry preferably has a mass density of 10%-20%.

In the present disclosure, after getting the desulfurization slurry, it desulfurizes the sulfur dioxide gas and the desulfurized gas and gypsum slurry are obtained.

In the present disclosure, the desulfurization slurry is in reverse contact with the sulfur dioxide gas during desulfurization operation.

In the present disclosure, after getting the gypsum slurry, liquid-solid separation is carried out on the gypsum slurry to get the gypsum residue and the calcium sulfite. The present disclosure has no special limitations on the specific method of the liquid-solid separation, and a method well known to those skilled in the art may be adopted. Specifically, the slurry is concentrated in a thickener before filtered in a vacuum belt filter.

In the present disclosure, the converting is preferably flash converting. The gypsum residue and the calcium sulfite are blended with the matte and then recycled to the flash converter for slagging. $SO_2$ is released into the converting off-gas and sulfuric acid is produced in the acid plant. Additional limestone or lime is fed into the flash converter in operation.

In the present disclosure, the ratio of the total mass of the gypsum residue and the calcium sulfite to the mass of the matte is preferably of (0-3):100. The total mass of the gypsum residue and the calcium sulfite is not 0, and the ratio is more preferably of (1.5-2.5):100.

In the present disclosure, the ratio of the matte to the limestone or lime fed directly to flash converter is preferably of 100:(1-5), more preferably 100:(2-3).

In the present disclosure, the converting is preferably bath converting. In the progress of feeding the matte into the bath converter, the gypsum residue and the calcium sulfite, are blended with limestone or lime, and then recycled to the bath converter for slagging. $SO_2$ is resolved into converting off-gas and sulfuric acid is produced in the acid plant.

In the present disclosure, the gypsum residue and the calcium sulfite is preferably dried after being blended with the matte.

In the present disclosure, the ratio of the total mass of gypsum residue and calcium sulfite to the mass of the limestone or lime is preferably of (0-1):(0.5-1.5), and the total mass of the gypsum residue and the calcium sulfite is not 0.

In the present disclosure, the ratio of the total mass of the gypsum residue and the calcium sulfite to the mass of the matte is preferably of (0-3):100. The total mass of the gypsum residue and the calcium sulfite is not 0, and the ratio is more preferably of (1.5-2.5):100.

In the present disclosure, the ratio of the matte to the limestone or lime is preferably of 100:(1-5), more preferably 100:(2-3).

In the present disclosure, the gypsum residue and the calcium sulfite are decomposed into CaO and sulfur dioxide containing gas in the converting furnace. CaO is slagged with $Fe_3O_4$ generated from oxidation of the matte producing calcium ferrite slag, and the sulfur dioxide containing gas is recovered as sulfuric acid.

In the present disclosure, the calcium ferrite slag, the blister copper, and the sulfur dioxide containing gas are preferably obtained in the converting process, and the sulfur dioxide containing gas is recovered preferably as sulfuric acid. The present disclosure has no special limitations on the specific method for sulfuric acid production, and a method well known to those skilled in the art may be adopted.

Figure 2:
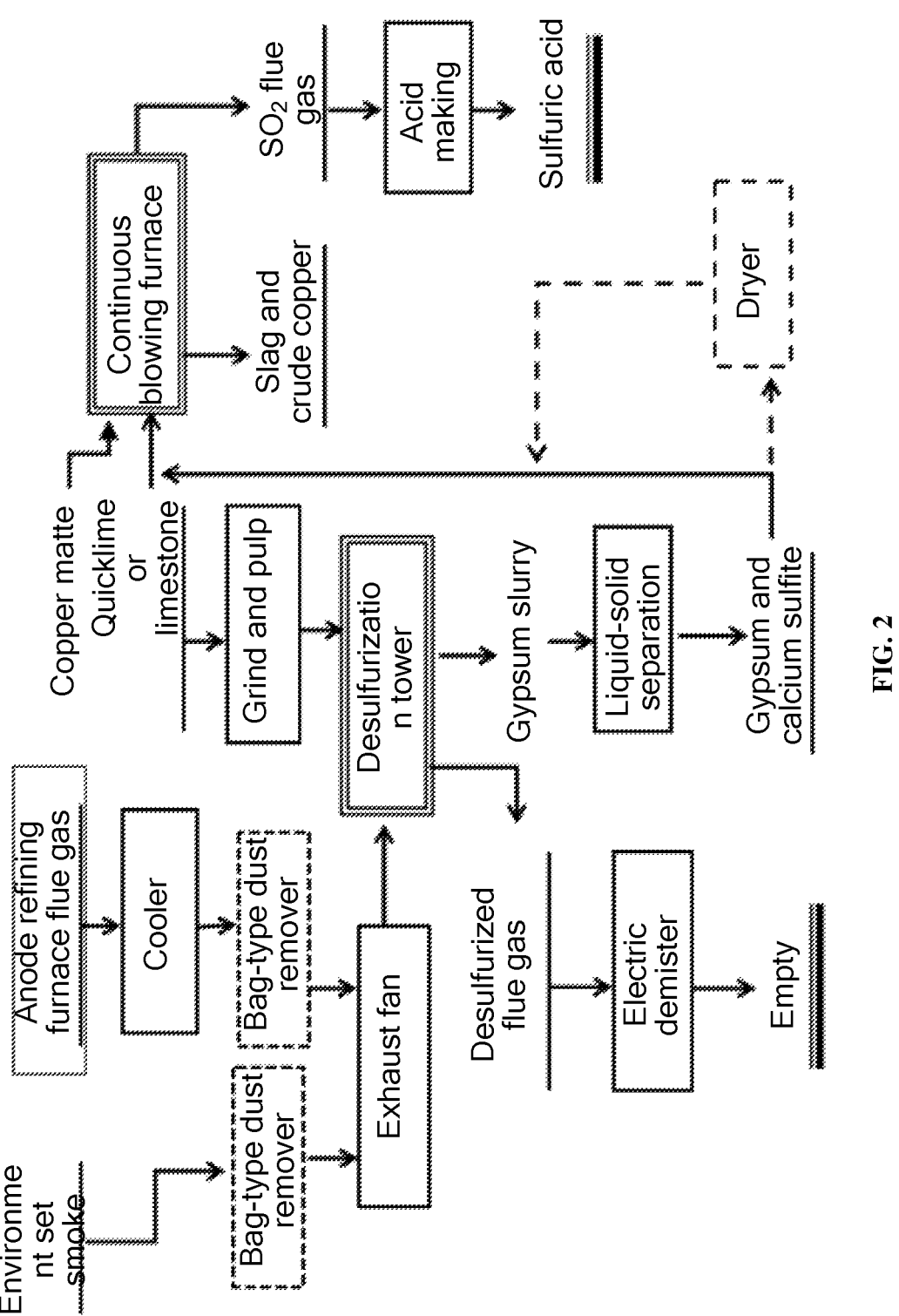
FIG. 2 is the flow diagram of the desulfurization and sulfur recovery method when the converting furnace takes calcium ferrite slag.

FIG. 2 shows the flow diagram of the desulfurization and sulfur recovery method when the converting furnace takes calcium ferrite slag. The anode refining furnace off-gas is cooled in a cooler and dedusted by a bag filter. The environment ventilation gas enters the bag filter for dust removal. After dust removal, the anode refining furnace off-gas and the environment ventilation gas are combined, and enter the desulfurization tower through the exhaust fan for desulfurization. The SO2 gas produced in the smelting of non-ferrous metal sulfide concentrate is desulfurized by taking the slagging flux limestone/lime as the desulfurizer to obtain the desulfurized gas and the gypsum slurry. The gypsum slurry is subjected to liquid-solid separation to obtain the gypsum residue and the calcium sulfite. The gypsum residue and the calcium sulfite are blended with the matte (copper matte) and fed to the converting furnace. When the flash converting process is employed, the gypsum residue and the calcium sulfite are blended with the matte, dried in a dryer, and fed to the flash converting furnace. After converted by the converting furnace, slag, blister copper, and SO2 containing gas are produced. The $SO_2$ containing gas is used for sulfuric acid production. The desulfurized gas is vented to the air after being cleaned by a wet ESP.

In the present disclosure, sulfuric acid is preferably produced in an acid plant. The present disclosure has no special limitations on the specific method for sulfuric acid production, and a method well known to those skilled in the art may be adopted.

In the present disclosure, the tail gas is preferably obtained from the sulfuric acid production. In the present disclosure, the tail gas is preferably combined with the environment ventilation gas and the anode refining furnace off-gas, and introduced into the desulfurization tower for desulfurization.

In the present disclosure, the desulfurized gas is preferably vented into the atmosphere after being treated with the wet electrostatic precipitator (ESP) and reaching the China national "Emission standard of pollutants for copper, nickel, cobalt industry" (GB 25467-2010 and its amendments).

In the present disclosure, when the gypsum residue and the calcium sulfite are recycled to both of the smelting and converting furnace for slagging, the ratio of the mass of the gypsum residue and the calcium sulfite recycled to the smelting to the mass of that recycled to the converting is preferably of (0-100):(100-0).

FIG. 1 shows the flow diagram of the $SO_2$ gas desulfurization and sulfur recovery method for the present disclosure in smelting of non-ferrous metal sulfide concentrate. The SO2 gas produced in the smelting of non-ferrous metal sulfide concentrate is desulfurized by taking the slagging flux as the desulfurizer, producing the desulfurized gas, the gypsum residue, and the calcium sulfite. The gypsum residue and the calcium sulfite are recycled to smelting furnace or converting furnace for slagging and sulfur is recovered. When recycled to the smelting furnace, the gypsum residue and the calcium sulfite are blended with silica and copper concentrate for slag production. When recycled to the converting furnace, the gypsum residue and the calcium sulfite are blended with the slagging flux (lime or limestone) for slag production. The SO2 containing off-gases from the smelting furnace or converting furnace are for sulfuric acid production.

To further describe the present disclosure, in the following a desulfurization method provided by the present disclosure for weak $SO_2$ gas in smelting of non-ferrous metal sulfide concentrate are described in details with reference to the application examples. However, these examples should not be construed as limitations to the protection scope of the present disclosure.

EXAMPLE 1

A copper smelter with an annual output of 400,000 tons of primary cathode copper takes flash smelting and flash converting process. The total flow rate of the environment ventilation gas and the refining furnace off-gas is 400,000 $Nm^3$/h with an average $SO_2$ strength of 1,507 $mg/Nm^3$. Lime is used as slagging flux with a total consumption of 76 t/d. Limestone is used as desulfurizer with consumption of 25.67 t/d which is equivalent to 14.38 t/d of CaO. 44.14 t/d of gypsum residue and calcium sulfite is produced by desulfurization. The amount of flux used for desulfurization and then recycled as gypsum residue to the converting furnace for slagging is about 19 wt. % of the total flux. Due to recycling of the gypsum residue, the total amount of flux fed to the flash converting furnace is increased from 76 t/d to 105.76 t/d.

EXAMPLE 2

A smelter with an annual output of 550,000 tons of primary cathode copper takes side blowing smelting and multi-lance top-blowing converting process. The total flow rate of environment ventilation gas, anode refining furnace off-gas, acid plant tail gas and anode slime refinery gas is 670,000 $Nm^3$/h with an average $SO_2$ strength 1,055 mg/$Nm^3$. Limestone is used as slagging flux in the converting furnace with a consumption of 33.33 t/d. 23.68 t/d of the 33.33 t/d limestone is first used as slagging flux accounting for 71 wt. % of the total amount. 47.91 t/d of gypsum residue is produced by desulfurization which is recycled and fed to the multi-lance top-blowing converting furnace as flux together with the remaining limestone through a belt conveyor, with a total amount of 57.57 t/d.

EXAMPLE 3

A smelter with an annual output of 220,000 tons of primary cathode copper takes the process of side blowing smelting, PS converting and rotary anode furnace refining. The flow rate of the environment ventilation gas, including anode furnace off-gas is of 650,000 $Nm^3$/h with an average $SO_2$ strength 0.01 wt. %. The consumption of limestone (with a purity of 90%) for desulfurization is of 2,433 t/a. 4,501 t/a of gypsum is produced, 13.2 tons per day. All of the gypsum residue is recycled to the smelting furnace and fed directly to the furnace through a belt conveyor with copper concentrate. Annually 528,544 tons of smelting slag is produced, and the CaO content in slag is up 0.232 percent by feeding gypsum.

The above described are merely preferred implementations of the present disclosure rather than limitations to the present disclosure in any form. It should be noted that those of ordinary skill in the art may further make several improvements and modifications without departing from the principle of the present disclosure, but such improvements and modifications should be deemed as falling within the protection scope of the present disclosure.

What is claimed is:

1. A desulfurization and sulfur recovery method for sulfur dioxide flue gas, comprising the following steps:
   desulfurizing the sulfur dioxide flue gas by taking part or all of slagging flux of a smelting process, using limestone or quicklime as a desulfurizer, chemically absorbing $SO_2$ in the sulfur dioxide flue gas to obtain gypsum residue, calcium sulfite, and desulfurized flue gas, wherein $SO_2$ in the sulfur dioxide flue gas before desulfurization is less than 1 vol %, and recycling the gypsum residue and calcium sulfite to a smelting furnace for slagging, and resolving the $SO_2$ into off-gases to produce sulfuric acid in an acid plant,
   wherein a process of recycling the gypsum residue and the calcium sulfite to the smelting furnace for slagging and resolving $SO_2$ into the off-gases to produce sulfuric acid comprises the following steps:
   grinding and making slurry of the slagging flux in sequence to get desulfurization slurry;
   desulfurizing the sulfur dioxide flue gas with the desulfurization slurry to get the desulfurized flue gas and gypsum slurry;

conducting liquid-solid separation on the gypsum slurry to get the gypsum residue and the calcium sulfite; and
   blending the gypsum residue and the calcium sulfite with silica and copper concentrate, feeding a resulting mixture to the smelting furnace, and resolving $SO_2$ into smelting off-gases to produce the sulfuric acid in the acid plant.

2. The desulfurization and sulfur recovery method for sulfur dioxide flue gas according to claim 1, wherein the desulfurization slurry has a mass density of 10%-20%.

3. The desulfurization and sulfur recovery method for sulfur dioxide flue gas according to claim 1, wherein a ratio of a total mass of the gypsum residue and the calcium sulfite to a mass of the silica and a mass of the copper concentrate is of (0-0.8): 5:100.

4. A desulfurization and sulfur recovery method for sulfur dioxide flue gas, comprising the following steps:
   desulfurizing the sulfur dioxide flue gas by taking part or all of slagging flux of a converting process, using limestone or quicklime as a desulfurizer, chemically absorbing $SO_2$ in the sulfur dioxide flue gas to obtain gypsum residue, calcium sulfite, and desulfurized flue gas, wherein $SO_2$ in the sulfur dioxide flue gas before desulfurization is less than 1 vol %; and recycling the gypsum residue and the calcium sulfite to a converting furnace for slagging, and resolving $SO_2$ into off-gases to produce sulfuric acid in an acid plant,
   wherein a process of recycling the gypsum residue and the calcium sulfite to the converting furnace for slagging and resolving $SO_2$ into the off-gases to produce sulfuric acid comprises the following steps:
   grinding and making slurry of the slagging flux in sequence to get desulfurization slurry;
   desulfurizing the sulfur dioxide flue gas with the desulfurization slurry to get the desulfurized flue gas and gypsum slurry;
   conducting liquid-solid separation on the gypsum slurry to get the gypsum residue and the calcium sulfite; and
   under a condition that the converting process is a flash converting process, blending the gypsum residue, the calcium sulfite and matte, feeding a resulting mixture to a flash converting furnace, resolving $SO_2$ into converting off-gases, to produce sulfuric acid in the acid plant, wherein in flash converting operation, the limestone or the quicklime is further fed to the flash converting furnace; and
   under a condition that the converting process is a bath converting process, while feeding matte to a bath converting furnace, blending the gypsum residue, the calcium sulfite with the limestone or the quicklime, recycling to the bath converting furnace for slagging, and resolving $SO_2$ into converting off-gases to produce sulfuric acid in the acid plant.

5. The desulfurization and sulfur recovery method for sulfur dioxide flue gas according to claim 4, wherein the desulfurization slurry has a mass density of 10%-20%.

6. The desulfurization and sulfur recovery method for sulfur dioxide flue gas according to claim 4, wherein a ratio of a total mass of the gypsum residue and the calcium sulfite to a mass of the matte fed to the flash converting furnace or the bath converting furnace is (0-3):100.

7. The desulfurization and sulfur recovery method for sulfur dioxide flue gas according to claim 6, wherein the ratio of the matte to the limestone or the quicklime fed to the flash converting furnace or the bath converting furnace is 100:(1-5).

8. The desulfurization and sulfur recovery method for sulfur dioxide flue gas according to claim 4, wherein a ratio of a total mass of the gypsum residue and the calcium sulfite to a mass of the limestone or the quicklime fed to the flash converting furnace or the bath converting furnace is (0-1): 5 (0.5-1.5).

\* \* \* \* \*